June 23, 1942. C. A. REIMSCHISSEL 2,287,394
TAPER DIE HEAD
Filed May 13, 1940 2 Sheets-Sheet 1
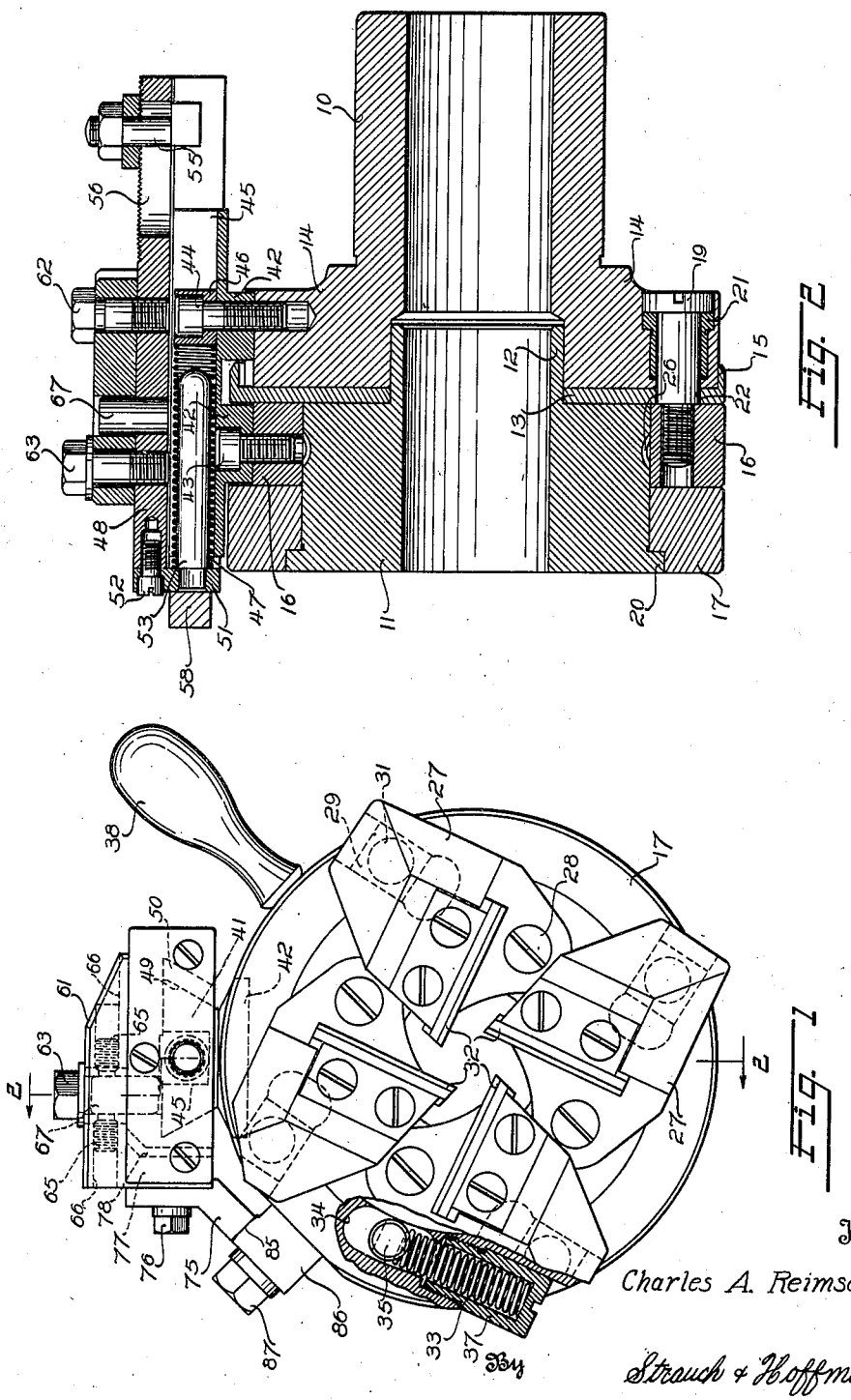
Inventor
Charles A. Reimschissel
By Strauch & Hoffman
Attorneys

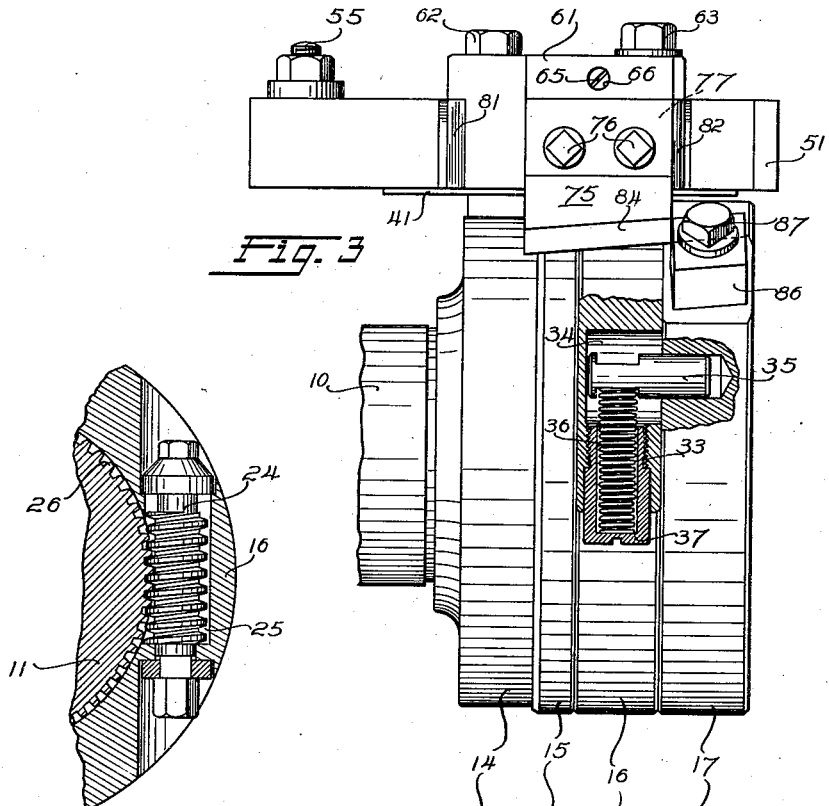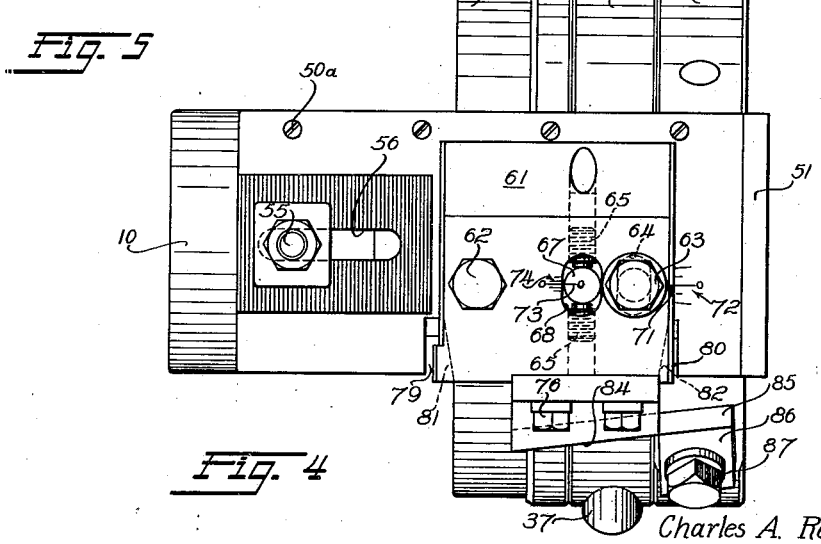

Patented June 23, 1942

2,287,394

UNITED STATES PATENT OFFICE 2,287,394

TAPER DIE HEAD

Charles A. Reimschissel, Waynesboro, Pa., assignor to Landis Machine Company, Waynesboro, Pa., a corporation of Pennsylvania Application May 13, 1940, Serial No. 334,916

14 Claims. (Cl. 10—100)

This invention relates to thread-cutting die heads, and more specifically to means for causing such a head to cut tapered threads whose length is not limited to the width of the threading chasers employed.

My present disclosure deals with a pivoted holder type of die head; that is, a die head having the chaser carrying holders pivoted on the head body and adapted to be actuated by a ring surrounding the head body. Such a die head, together with a taper threading means applied thereto, is disclosed by Newman in Patent No. 1,665,973. The essential difference between my invention and that of Newman lies in the fact that the taper threading means which I employ is adjustable primarily to compensate for slight taper errors which are inherent to the Newman construction, but which were not objectionable at the time the Newman patent was applied for.

Pivoted holder die heads generally are designed to be opened by rotating the holder actuating ring with respect to the die head body. Such heads may be made to cut a tapered thread by accurately controlling the opening action during the thread cutting period by controlling the rotation of the holder actuating ring. After the desired thread length has been cut, the holder ring is rotated rapidly to disengage the chasers from the work.

The Newman patent discloses a flat faced cam for controlling the gradual opening action of the pivoted chaser holders during the threading operation to produce a tapered thread. While the use of a straight face cam theoretically does not yield a uniform taper, due to the fact that the cutting diameter should be increasing uniformly at all times, and uniform diametrical increase is not obtained by a uniform rotation of the holder actuating ring, the error introduced is of negligible consideration. However, a differently inclined cam is necessary for each appreciably distinct diametrical range of the die head, that is, the minor diametrical change during a taper threading operation does not appreciably affect the taper rate, but an appreciable change in the initial diameter of the die head necessitates a differently inclined cam if the taper is to be very precise.

At the time of its introduction to the trade, the die head of the Newman patent served very satisfactorily with regard to the then existing taper tolerances. Today, however, certain of these tolerances have become so close that, in many instances, it would be necessary to employ a considerable number of minutely differently inclined cams in order to cover the full diametrical range of the die head. To eliminate this expense, and to render the machine flexible, I have provided a novel means for adjusting the inclination of my cam, so that it can be inclined to compensate for the taper error inherent to any diameter within the range of the head.

Thus, the primary object of my invention is to provide a tapered thread cutting mechanism which is adjustable to cut various diametered threads and embodies novel means for compensating for any errors incident to adjusting the diametrical setting of the mechanism.

Another important object of my invention is to provide a tapered thread cutting mechanism embodying a novel cam assembly which is adjustable to compensate for certain errors inherent in such mechanisms, and which also is adjustable to permit the cutting of threads having appreciably different tapers.

Another object of my invention is to provide, in a tapered thread cutting mechanism, means which indicate the amount of compensation for various tapers and diameters.

A further object of my invention is to provide a novel adjustable taper mechanism which may be applied to certain existing die heads, is very rugged, and yet can be set to yield a precise taper.

Further objects will become apparent as the specification proceeds in conjunction with the accompanying drawings, and from the appended claims.

In the drawings:

Figure 1 is a front view of a die head embodying the novel taper mechanism of my invention with certain parts broken away and in section to more clearly show the construction;

Figure 2 is a longitudinal sectional view of the die head shown in Figure 1, taken substantially along the line 2—2 of that figure;

Figure 3 is a side elevational view of the die head of Figure 1 as it appears when viewed from the left-hand side of that figure and at the instant of tripping;

Figure 4 is a top plan view of the die head shown in Figures 1 to 3 at the instant of tripping and;

Figure 5 is a fragmental sectional view showing the diametrical adjustment mechanism of the die head of Figures 1 to 4, inclusive.

With continued reference to the drawings, wherein like reference characters have been employed to designate like parts through the several views, and referring more particularly to Figures 1, 2 and 3, the die head is provided with a shank 10, adapted to be received by a suitable bore in a machine such as a turret lathe and it supports all of the parts of the head.

A head body 11 is mounted for limited rocking movement within shank 10 by means of a flange 12, and carries the chasers, as will hereinafter appear.

A zero plate 13 is disposed between body 11 and a flange 14 provided on shank 10, and is secured to body 11 by any suitable means (not shown). A flange 15 on plate 13 cooperates with indicia on flange 14 to indicate the adjusted position of the body relative to the shank. An adjusting ring 16 and a chaser controlling or operating ring 17 fit over head body 11 and are mounted for rocking movement with respect thereto.

Locking pins (not shown) are utilized to prevent relative rotation between the shank 10 and adjusting ring 16. These pins are pressed into the annular flange 14 and coact with suitable bores in the adjusting ring, as shown in Patent No. 1,665,973. Zero plate 13 is securely attached to head body 11, and, together with a flange 20 on head body 11, retains rings 16 and 17 in their proper axial positions.

The head body is restrained against axial displacement from the shank by means of screws 19 fitting in bushings 21 in flange 14 and threaded into adjusting ring 16. They are shouldered to afford just sufficient axial play to permit zero plate 13 to rotate with respect to the shank. Arcuate slots 22 in plate 13 permit limited relative rotation of the plate and shank without interference from screws 19.

Adjusting ring 16 is employed to adjust the diametrical setting of the head, and is actuated by a worm screw member 24, journalled in a recess 25 in ring 16, and meshing with worm teeth 26 provided on head body 11.

Head body 11 is provided with chaser holders 27 which are pivotally secured thereto by trunnion screws 28 which engage the trunnions (not shown). Holders 27 are adapted to be actuated by sliding blocks 29 mounted on sliding block pins 31, which in turn are fastened in oscillatory ring 17, whereby movement of ring 17 around head body 11 will result in turning the chaser holders 27 about their pivots in die head body 11 and further will position the tangential chasers 32 which are carried by the said holders 27 in various diametrical relationships, depending upon the amount of rotation which ring 17 experiences. The chasers are normally urged outwardly by a spring 33, located in a recess 34 in adjusting ring 16. The recess is approximately tangent to head body 11 and is open at the side adjacent ring 17. Spring 33 bears at one end against a pin 35 on oscillatory ring 17, which extends into recess 34. At its other end, spring 33 extends into a smaller recess 36, which opens out to the peripheral face of ring 16. Recess 36 is closed by a threaded hollow plug 37 which receives the outer end of spring 33 and which is adjustable to vary the compression of said spring. Spring 33 accordingly urges ring 17 in a clockwise direction (as viewed in Figure 1) and through pins 31 and blocks 29 tends to rock holders 27 and chasers 32 clockwise so as to open the head. When the head is opened, pin 35 abuts the bottom of recess 34 to limit movement of ring 17. Ring 17 is also provided with a handle 38, for restoring the chasers to cutting position after they have been tripped.

The structure so far described is substantially the same as that shown in Patent 1,665,973, modified to incorporate certain of the die head improvements shown in Patent No. 1,760,568.

As a matter of fact, I have designed my present die head structure so that it is possible to convert one built in accordance with the disclosure of Patent 1,760,568, into one of the present type with a minimum of alterations. To effect such a change, bushings 21 are substituted for the normal pull back springs, since the present head is not designed to be tripped or opened by a pull off action. Screws 19 now coact with the bushings to fasten the shank and adjusting ring 16 together with but sufficient axial play to permit the zero plate 13 to rotate with the head body 11. Thus, while I prevent relative rotation of adjusting ring 16 with respect to shank 10 by means of the locking pins (not shown), I utilize screws 19 and abutment bushings 21 to prevent axial movement between the front and rear units of the head: namely, the said die head body and surrounding ring frame and the said shank member. Further, I now employ shorter locking pins (not shown) which extend only into the said adjusting ring 16, for if they were to extend into oscillatory ring 17, the latter would be locked against rotation at all times. Finally, it merely is necessary for me to machine the periphery of the ring frame and shank to receive my novel adjustable taper mechanism, which will now be described.

My novel adjustable taper mechanism is mounted on a slider which in turn is mounted for movement longitudinally of the head on a guide or track and adjusting ring 16.

Track 41 comprises a bar or block in the form of a double trapezoid (in end elevation) with foot portions 42 bridging zero plate 13 and having flattened faces for engagement with similar faces machined on flange 14 and ring 16, to which they are secured by screws 43 and 44. Screw 44 serves to also secure in place, within a recess 45 in track 41, a block 46, against which a spring 47 bears at one end.

A slider 48, of block-like form, and having a dovetail-shaped groove 49 open at both ends and a gib 50, adjustably held in place by screws 50a (Figure 4), is mounted for sliding movement longitudinally of the head on track 41. The front end of groove 49 is closed by a plate 51 secured to slider 48 by screws 52. Spring 47 presses against front portion 51, and the latter carries a guide rod 53 to align the spring. It will be evident that spring 47 constantly tends to force slider 48 forwardly of the die head.

The forward movement of slider 48, due to the pressure of spring 47, may be limited by a bolt 55 projecting into groove 49 at the rear of block 46, and adjustably secured in a slot 56. Bolt 55 cooperates with block 46 to limit forward movement of the slider. The forward position of the slider relative to the head determines the length of thread to be cut, so by adjusting stop 55 forwardly or rearwardly on the slider the length of thread cut may be decreased or increased, as desired.

The slider may be actuated by having forward portion 51 thereof abut a fixed abutment 58 (shown diagrammatically in Figure 2) in front of the die head, and advancing the head forwardly with respect to the work. However, if the head is to remain stationary, an abutment may be arranged to move longitudinally with the work to engage plate 51 and thereby to move slider 48 rearwardly with respect to the die head. In either case, oscillatory ring 17 is permitted to turn under the action of spring 33 to vary the diametrical thread cutting relation of chasers 32 and thereby to cause the die head to cut a tapered thread.

For the purpose of making the cam rotatably adjustable with respect to slider 48, I preferably mount it on a rotatable cam carrying member 61, which in turn is carried by the slider. The cam carrying member is best seen in Figures 1, 2 and 4 and comprises a flat plate and is fastened to slider 48 by a pivot screw 62 and being rotatable thereabout. Member 61 is also secured to the slider by a second screw 63, which is also threaded into slider 48. An arcuate slot 64 is incorporated in member 61 to avoid interference from screw 63 as the member is rotated about its pivot 62. To effect rotation of the cam carrying member I preferably employ a pair of adjusting screws 65, located in opposed threaded bores 66 of member 61, which contact an abutment dowel 67 rigidly carried by slider 48. Dowel 67 projects upwardly through an arcuate slot 68 in plate 61.

From the structure so far developed, it is apparent that by loosening screws 62 and 63 and rotating screws 65, plate 61 may be rocked in either direction about screw 62 as an axis. To denote the adjusted position of the cam carrying member, I preferably employ two independent sets of indicia. One set comprises a zero mark 71 on plate 61 and a cooperating scale 72 on the upper face of slider 48. The other set comprises a zero mark 73 on dowel 67 and a scale 74 on the upper face of plate 61. The two scales are designed to be used with two different cams, as will later appear.

A cam 75 is secured by means of a pair of screws 76 to a depending portion 77 of plate 61. As seen in Figures 1 and 4, clearances 78, 79, and 80 are provided between the depending portion 77 of plate 61 and plate 48, and plate 61 is undercut at 81 and 82 so as to provide for free rocking movement of the cam support on the slider.

Cam 75 is provided with a flat face 84, which cooperates with the curved face 85 of a lug or abutment 86 secured to ring 17 by means of a screw 87. When plate 61 is rocked to vary the inclination of the cam, screw 87 is also preferably loosened and lug 86 is rocked slightly so as to maintain its face substantially in parallelism with the cam.

Taking up the operation of the apparatus, and assuming that slider 48 is in its forwardmost position, as determined by stop 55, ring 17 is held in operative position against the action of spring 33 by cam 75 which engages lug 86. The head is then adjusted to proper diametrical size by rotative screw 24 to effect rocking movement of the head body on the shank in the proper direction. During this adjusting operation, ring 17 is not permitted to rotate, because lug 86 engages the cam and is held stationary.

After the initial cutting diameter has been established in the manner just described, the work is introduced into the chasers and the threading operation is initiated.

As the threading operation proceeds, relative axial movement of the die head and abutment 58, which contacts plate 51, causes slider 48 and cam 75 to be moved rearwardly with respect to abutment 86, against the action of spring 47. During this operation, the force of spring 33 serves to keep abutment 86 in contact with the camming face of cam 75 and, consequently, this effects a controlled rotation of oscillatory ring 17, which in turn effects gradual outward movement of the chasers. Thus, the die head is made to cut a tapered thread. When the forward edge of cam 75 reaches the position shown in Figures 3 and 4, additional rearward movement of slider 48 permits abutment 86 to lose contact with cam 75, and the resulting accelerated rotative movement of oscillatory ring 17, under the influence of spring 33, rotates chaser holders 27 a sufficient amount to disengage the chasers 32 from the threaded work. After removing the work, the operator rotates the ring counterclockwise (Figure 1) to a position where cam 75 can pass abutment 86, whereupon the now compressed spring 47 will automatically force slider 48 forwardly to the position established by bolt 55. The parts are now restored to initial thread-cutting position.

The general practice has been to supply taper cutting die heads with a cam for cutting ¾" per foot or ⅜" per foot included taper, which two tapers are most common. It has been found that by suitably curving face 85 of abutment 86 the taper error introduced in the relatively short thread lengths usually cut by such die heads is negligible; however, since the cams are designed for optimum accuracy for one particular initial cutting diameter, major diametrical changes such as those occasioned by changing the diametrical setting of the die head from that for which the cam was designed have necessitated new cams incorporating a properly compensated inclination of the camming face. This has been accelerated by the rapid progress in drafting more exacting taper specifications.

The present invention wholly eliminates the necessity for employing a multitude of slightly differently inclined cams, all designed for a particular taper, but especially adapted for a certain individual cutting diameter, because it embodies an adjustable taper mechanism, which enables me to employ a single cam for one particular taper, but adapted for usage within the entire diametrical range of the head. Further, I have found that my novel taper cutting die head employing my new adjustable taper mechanism is capable of cutting tapered threads of any diameter within its range, the threads having taper accuracies well within any existing standards. The adjustment feature may best be illustrated by describing a specific threading operation.

Assuming that the head, during the previously described operation, was set to produce a thread having ¾" taper per foot on 1 inch diameter work and that it is now desired to cut a thread having the same taper, but on 1½ inches diameter work. The diametrical adjustment is carried out by rotating screw 24 in the manner previously described. Since cam 75 will not accurately cut a tapered thread for the increased diametered work, it is adjusted as follows.

Screws 62 and 63 are loosened, and cam support 61 is rotated around pivot 62 a predetermined amount and then secured in place by tightening the screws. This results in effect in changing the inclination of the camming face of cam member 75. The correct setting is determined by observing the proper set of indicia, and the threading operation is then carried out as before. Thus, it is possible to adjust the inclination of the camming face for any particular diameter within the range of the die head, and thereby to avoid the use of a multiplicity of cams for this purpose. Further the parts are graduated with two sets of indicia, expressing the amount of rotation of member 61 in terms of minutes of taper compensation for two particular tapers, say ¾" and ⅜", although more than two may be employed if desired, depending upon the number of different tapered cams to be used.

Therefore, after determining the particular taper error for any initial diameter, the compensation may readily be made by using the proper set of indicia as reference marks. This will depend upon whether a ⅜" or a ¾" taper cam is being used in the head. It should be remembered that these two particular tapers constitute practically the only ones which are utilized and definitely are used on the vast majority of work, so the machine is particularly designed for use with two cams for producing these tapers. If, however, a special taper is to be cut, it is evident that the indicia may be made to conform therewith rather than with either of the two tapers which have been mentioned, and that more than two different cams may be used if desired.

When it is desired to adjust the head to cut a different length thread, stop 55 is loosened and moved along slot 56 into the proper position and tightened. Since this results in moving cam 75 with respect to lug 86, the chasers are moved either inwardly or outwardly, depending upon the direction the stop is adjusted. The proper diametrical setting must be accordingly restored by rotating screw 24, as previously described.

Throughout the preceding discussion I have stressed the advantages of using my novel adjustable taper mechanism with pivoted holder type die heads for compensating taper errors inherent thereto when such heads experience a diametrical adjustment. It should now be obvious that the degree of adjustability which can be effected is sufficient to compensate for taper errors due to slight errors in the cams, to wearing of the die head parts, to the manner in which the head is mounted, etc.; therefore a major advantage of my mechanism lies in its ability to compensate taper errors due to many varied causes. Naturally, my novel adjustable taper mechanism is also extremely useful when applied to other types of die heads not employing strictly pivoted holders; consequently, while I have stressed the advantages of my mechanism as applied to pivoted holder type die heads, it should be understood that the said mechanism is capable of compensating taper errors due to varied causes and that the invention is not limited to pivoted holder type heads, but can be applied to many different types of heads.

From the foregoing description of my invention, it is obvious that I have achieved all my objectives. Further, it is possible for me to cut threads having a reversed taper by merely reversing the inclination of the camming face of cam 75 and by changing the direction of the action of spring 33. Finally, I can adapt my mechanism to cut various tapers which are reasonably different one from the other without changing cams—increasing the side clearances between members 41 and 61 if necessary—the graduations shown in the drawings being exaggerated to a considerable degree.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

Having fully described my said invention, what I claim as new and desire to secure by Letters Patent is:

1. In combination, tangential chasers; pivoted chaser-holders carrying said chasers; an oscillatory ring for actuating said holders and chasers; an abutment carried by said ring; and a cam adapted to contact said abutment and being so inclined as to actuate said ring; means adjustably mounting said cam for movement into various degrees of inclination with respect to said abutment, to compensate for taper errors incident to pivoting said chaser holders inwardly or outwardly.

2. In combination, tangential chasers; pivoted chaser holders carrying said chasers; an oscillatory ring for actuating said holders and chasers; an abutment carried by said ring; a slider mounted for axial movement with respect to said ring; resilient means urging said slider in one direction; a cam carried by said slider and adapted to contact said abutment and being so inclined as to actuate said ring; resilient means acting against said ring to maintain said abutment in contact with said cam; means mounting said cam on said slider for adjustment into various degrees of inclination with respect to said abutment.

3. In combination, a head; tangential chasers pivotally mounted on said head; an oscillatory ring for actuating said chasers; an abutment carried by said ring; a cam adapted to contact said abutment and actuate said ring; means mounting said cam for adjustment into various degrees of inclination with respect to said abutment; and indicia means for denoting the amount of adjustment of said cam in terms of angle of taper, for several diametrical settings of said chasers.

4. In a tapered thread cutting mechanism, a head having a plurality of chasers pivoted thereon for inward and outward movement; means for adjusting said chasers to cut different diametered work; a rocking element operable to control inward and outward movement of said chasers; a support mounted for movement substantially longitudinally of said head; an inclined cam mounted on said support, means mounting said cam for adjustment into a plurality of different inclinations with respect to the direction of travel of said support; and means for transmitting camming forces from said cam to said rocking element.

5. In a tapered thread cutting mechanism, a head; a plurality of chasers pivotally mounted on said head; a ring carried by said head and connected to each of said chasers, for controlling the action thereof; spring means acting upon said ring so as to urge said chasers out of thread cutting position; a cam mounted for longitudinal movement on said head and cooperating with a lug on said ring to hold the latter in thread cutting position; means for adjusting said chasers inwardly or outwardly without disengaging said cam from said lug, to change the diametrical setting of the mechanism; and means for adjusting the inclination of said cam with respect to said lug, to compensate for any errors introduced into the mechanism through diametrical adjustment of said chasers.

6. The mechanism defined in claim 5, wherein said cam is mounted for adjustable piovtal movement on a slider, and the latter is mounted for longitudinal movement on said head.

7. In a taper cutting die head having movable chasers, an adjustable taper mechanism for actuating said chasers comprising: a slider mounted for movement longitudinally of said die head; a cam assembly carried by said slider and pivoted for movement with respect thereto, to adjust it into various inclinations with respect to the direction of movement of said slider; an abutment carried by said slider; and a pair of opposed adjusting screws carried by said cam assembly and contacting opposite sides of said abutment, whereby accurate adjustments of said cam assembly with respect to said slider can be effected.

8. In a taper cutting die head, a plurality of chasers movably carried by said head; an adjustable taper mechanism for actuating said chasers comprising: a slider mounted for movement longitudinally of said die head; a cam carrying member pivoted on said slider to adjust said cam in various inclinations with respect to said head; an abutment dowel carried by said slider and projecting through an opening in said cam carrying member; a pair of opposed adjusting screws threaded into said member and cooperating with said abutment dowel, whereby adjustments of said cam carrying member with respect to said slider can be effected; and indicia means associated with said cam carrying member and said slider to denote the adjusted position of said member in terms of degrees of taper.

9. In a taper cutting die head, a plurality of chasers movably carried by said head; an adjustable taper mechanism for actuating said chasers comprising: a slider mounted for movement longitudinally of said die head; a cam carrying member pivoted on said slider for adjustment into various inclinations with respect to the direction of travel of said slider; an abutment dowel carried by said slider; a pair of opposed adjusting screws carried by said member and abutting said dowel, whereby adjustments of said cam carrying member with respect to said slider can be effected; and indicia means carried by said cam carrying member and said abutment dowel to denote the adjusted position of said cam carrying member in degrees of taper.

10. The die head defined in claim 9, wherein a second indicia means is associated with said cam carrying member and said slider and also being operable to denote the adjusted position of said cam carrying member in terms of degrees of taper, said first and second-named indicia means having different values, so as to denote the amount of adjustment in degrees of taper compensation for any two desired tapers.

11. In an adjustable taper die head, a shank; a head body; chasers on the body; an oscillatory ring on the body for moving said chasers into and out of operative position; an abutment on the ring; a cam having linear movement in fixed relation to the die head; said abutment and cam having faces contacting throughout a cutting operation to determine the operative size of the die head; a guide fixed to the shank of the die head; a support for the cam mounted on said guide and having means mounting said cam for adjustment into various inclinations with respect to the direction of travel thereof; and a second abutment having movement relatively to said support in a direction parallel to the axis of the head positioned to move the said cam along said guide.

12. In an adjustable taper die head, a shank; a head body; chaser-holders pivotally supported on the body; tangential thread cutting chasers on said holders; an oscillatory ring connected to said chaser-holders for moving said chasers into and out of operative position; means for adjusting said chasers inwardly or outwardly to thread differently diametered work; an outwardly projecting abutment on said ring; a longitudinal guide mounted on one side of the die head; a plunger slidable on said guide parallel to the shank; a cam carried by said plunger and adjustable to contact said abutment at various inclinations, to compensate for taper errors incident to diametrical adjustment of said chasers, said cam projecting from one side of the plunger so that the front end of the plunger will be free to act as actuator for the cam; and means for adjusting said body relatively to said shank and said ring, for adjusting the diametrical setting of said chasers.

13. In an adjustable taper die head, a shank; a head body; chaser-holders pivotally supported on said body; tangential thread cutting chasers on said holders; an oscillatory ring connected to said chaser-holders for moving said chasers into and out of operative position; an outwardly projecting abutment on said ring; a longitudinal guide mounted to one side of the die head; a plunger sliding on said guide parallel to said shank; a cam carried by said plunger to contact said abutment, said cam projecting from one side of the plunger and having means mounting it for rocking adjustable movement on said plunger; and adjustable stop means to limit the movement of the plunger to adjust, through the action of the cam, the size of the closed setting of the chasers.

14. In an adjustable taper die head, a shank; a head body; chaser-holders pivotally supported on said body; tangential thread cutting chasers on said holders; an oscillatory ring connected to said chaser-holders for moving said chasers into and out of operative position; an outwardly projecting abutment on said ring; a longitudinal guide mounted on one side of the die head; a plunger sliding on said guide parallel to said shank; a cam; means adjustably mounting said cam on said plunger so that it may contact said abutment at various selected inclinations, said cam projecting from one side of the plunger, the various longitudinal positions of the cam controlling, through the ring, the initial setting of said chasers for size, their gradual expansion for taper, and their total release.

CHARLES A. REIMSCHISSEL.